Sept. 14, 1965 F. B. CROWSON ETAL 3,206,551
EMERGENCY REPORTING ALARM EQUIPMENT FOR TELEPHONE STATIONS
Filed Nov. 25, 1960
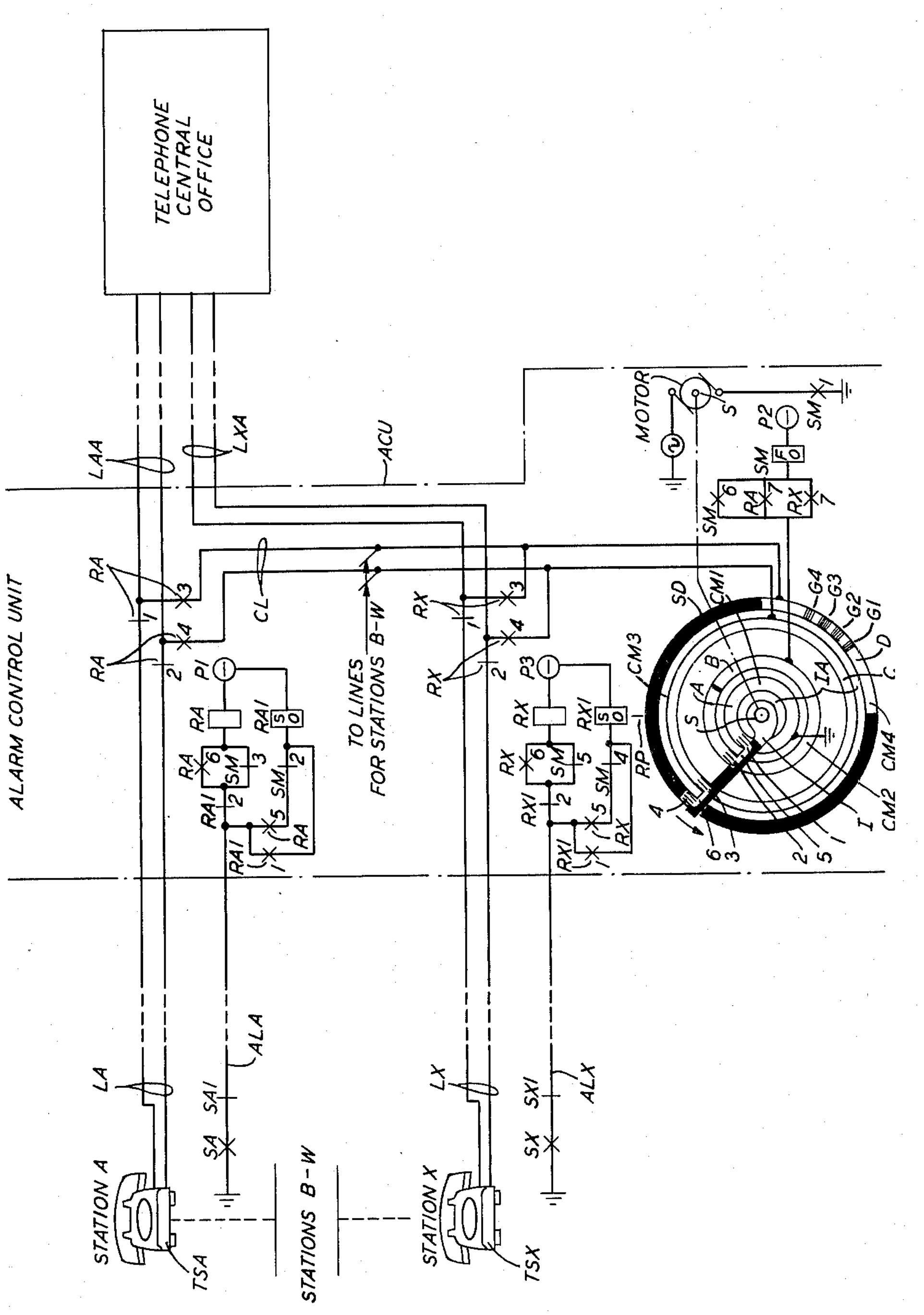
INVENTORS F. B. CROWSON
W. S. MICHEL
BY Donald M Duft
ATTORNEY United States Patent Office 3,206,551

Patented Sept. 14, 1965

3,206,551

EMERGENCY REPORTING ALARM EQUIPMENT FOR TELEPHONE STATIONS

Fred B. Crowson, Brooklyn, and Walter S. Michel, Forest Hills, N.Y., assignors to Bell Telephone Laboratories, Incorporated, New York, N.Y., a corporation of New York Filed Nov. 25, 1960, Ser. No. 71,782
18 Claims. (Cl. 179—5)

This invention generally relates to a telephone system and particularly relates to an emergency reporting telephone system having equipment that is associable with a plurality of telephone customer stations and is operable in response to the detection of emergencies at these stations for making alarm telephone calls over the regular telephone lines to report the nature of the detected emergencies to a central location. The invention more particularly relates to equipment for detecting an emergency at any one of a plurality of customer stations and for then transmitting, over a telephone line extending between that station and a telephone switching center, alarm information which identifies the emergency and causes equipment at the switching center to produce a record indicating both the identity of the station and the nature of the emergency.

Alarm equipments are often used in homes, business establishments, and other properties to detect such emergencies as fire, burglary, and the like. In many instances, when an emergency is detected, the alarm equipment utilizes the regular customer telephone facilities to make a special telephone call to authorities trained to cope with the emergency and to report to them valuable information regarding the type of emergency and its exact location. With such information, the authorities are then able to dispatch the most efficient aid in the quickest manner.

Although the presently available arrangements are technically reliable and adequately safeguard life and property, they are not extensively used because their cost is too high. A principal reason for the high cost is that a large quantity of complex and expensive equipment is normally required at each customer station to initiate the alarm calls and report the alarm information identifying the station and the nature of the emergency.

In view of the foregoing, an object of this invention is to provide an emergency reporting telephone system employing simple and inexpensive station alarm equipment.

In accordance with this invention, a more economical emergency reporting telephone system is provided by utilizing only a simple and inexpensive emergency detector and indicator at each station in densely populated areas, and by utilizing at a nearby location alarm transmitting equipment which is associable with the emergency indicators in a plurality of stations and which is operable in response to the detection of an emergency at any associated station for making an alarm call, over the regular telephone line of the station having the emergency, to report the nature of the emergency to a telephone switching center. This transmitting equipment is located proximate to a large number of telephone stations, such as those in a multi-dwelling building, and is associable with emergency indicating devices at these stations and with the telephone lines connecting each of the stations with the switching center. The equipment includes circuitry that is operable for detecting an emergency indicated by an indicating device at any one of the associated stations, for temporarily disconnecting from the telephone line the telephone set of the station having the emergency, for then making an alarm call over that line to transmit to the switching center a code identifying the detected emergency, and for thereafter effecting the reconnection of the telephone set to the line. In response to the received code, equipment at the switching center is operated to produce a printed record of the received code and of information indicating the identity of the station having the emergency. The record is then used by personnel at the switching center to inform the appropriate authorities of the emergency and its exact location.

An advantage of this invention is that the provided customer emergency reporting service is more economical since costly and complex individual alarm equipment is no longer needed at each protected station. Another advantage is that alarm information is transmitted rapidly by coded signals while the customer telephone set is disconnected from the telephone line. This method of transmission is, therefore, speedy and secret. Such speed and secrecy is desirable, for example, to prevent burglars from detecting the transmission of alarm information. A further advantage is that the telephone switching center is more efficiently used to serve both regular telephone calls and alarm calls without the addition of complex or expensive circuits.

A feature of this invention is the provision of alarm equipment in a telephone system for reporting to a telephone switching center an emergency arising at any one of a plurality of telephone stations and for causing the production of a record at the switching center which indicates both the station and the emergency.

Another feature is the provision of emergency reporting alarm equipment including circuitry for detecting an emergency at a telephone customer station, circuitry for temporarily disconnecting the customer telephone set from the regular telephone line, circuitry for making an alarm telephone call over that line to report the nature of the detected emergency to a telephone switching center and thereby cause equipment at the switching center to produce a record indicating the detected emergency and the station, and circuitry for effecting the reconnection of the telephone set to the line subsequent to the record production.

Another feature is the provision of emergency reporting alarm equipment for detecting an emergency at any one of a plurality of customer telephone stations and for transmitting to a telephone switching center, over the regular telephone line of the station having the emergency, an alarm code which identifies the detected emergency and causes equipment at the switching center to produce a record of the alarm code and of information indicating the identity of the station having the emergency.

Another feature is the provision of emergency reporting alarm equipment including circuitry for detecting an emergency at any one of a plurality of telephone customer stations; circuitry for temporarily disconnecting from the customer telephone line the telephone set of the station having the emergency; circuitry for originating an alarm call over that line; circuitry for transmitting over the line, subsequent to the call origination, an alarm code which identifies the detected emergency and causes equipment at the switching center to determine and supply information indicating the identity of the station having the emergency, and to then produce a record of the alarm code and the supplied information; and circuitry for effecting the reconnection of the telephone set to the line subsequent to the record production.

The foregoing objects, advantages, and features of this invention, together with others, may be more fully understood by reading the following description with reference to the accompanying single drawing which shows, in block and schematic form, the circuit and apparatus of an exemplary embodiment of the invention. In the drawing, relay apparatus is shown in the well-known detached form with "x" indicating a make contact and a vertical bar a break contact.

The telephone central office equipment with which this invention is intended to function, by way of example is disclosed in the United States Patent 2,913,526 issued November 17, 1959, to J. M. Smits et al.

Telephone customer stations A–X served by the emergency alarm system are illustrated in the left side of the drawing. The apparatus for the stations A and X are shown in detail while the apparatus for the stations B–W are not shown. Each of the stations is equipped with one of the telephone sets TSA–X which is connected over one of the telephone lines LA–X through the contacts 1 and 2 of one of the relays RA–X in the alarm control unit ACU and one of the telephone lines LAA–XA to the telephone central office to provide normal telephone service during the periods when no emergency condition is present at the protected customer station. Each station is also provided with an individual alarm circuit for informing the control unit ACU of an emergency condition thereat. Since the interrelation and functions of each of these alarm circuits with the unit ACU are essentially the same, it is deemed sufficient to describe them with reference to the one associated with station A. To simplify the following description, it is initially assumed that no emergency condition is present at any of the stations A–X and that regular telephone service is provided to these stations by means of the hereinbefore described facilities.

Before proceeding with the description of the individual alarm circuit of station A, it is noted that the unit ACU may be, for the purpose of convenience, located at the point where all of the individual lines in the customer stations are normally joined with lines in a single cable sheath to the telephone central office. Such junctions are normally made at a junction terminal box located on a telephone pole or in the basement of a multi-dwelling building.

The alarm circuit for station A includes the emergency indicating contact SA, alarm deactivating contact SA1, alarm lead ALA extending from station A to the unit ACU, and the RA and RA1 relay circuitry in unit ACU. Contact SA is used at station A to indicate an emergency condition such as burglary, fire and the like arising thereat. Contact SA1 is provided at station A to permit the customer to deactivate the alarm circuit during periods when alarm protection is not desired and after the contact SA is accidentally operated. In practice, more than one of each of the contacts SA and SA1 are generally provided. Such additional contacts may be employed in the instant arrangement by placing them in parallel with the contacts SA and SA1. When the system is used as a burglar alarm arrangement, for example, contact SA would be a circuit closing contact mounted in a frame of a window or the jamb of a door, and contact SA1 would be located in a convenient place to permit the alarm circuit to be opened during the daytime so that needless alarms are not given by the ordinary opening of windows and doors.

When contact SA1 is closed and an emergency condition occurs at station A, contact SA is operated to complete a circuit for operating relay RA to initiate circuit operations in the unit ACU and in the telephone central office that cause a record card to be made at the central office. The operate circuit for relay RA extends from ground through contact SA, contact SA1 over lead ALA to unit ACU, contact 2 relay RA1, contact 3 relay SM, and the winding of relay RA to the negative potential P1. Relay RA, upon operating, has five functions. The first function is to disconnect at its contacts 1 and 2 the telephone set TSA and line LA from the line LAA and thereby to temporarily interrupt all telephone service to and from station A. The second is to connect at its contacts 3 and 4 the line LAA to the control line CL and to the rings C and D of the stationary disc SD. Another function is to close at its contact 5 the operate circuit for the slow operate relay RA1 in unit ACU; however, as hereinafter explained, relay RA1 is not allowed to operate at this time. The fourth function is to close at its contact 6 a path parallel with contact 3 of the relay SM for enabling its own operate path to remain closed after relay SM is operated. The last function is to close at its contact 7 the circuit, hereinafter described, for operating the fast operate start motor relay SM in unit ACU. The operation of relay SM closes its contact 1 to complete the circuit for operating the AC motor in the unit ACU and it also opens at its contacts 2 and 4 the operate paths for the relays RA1–X1 before the slow operate relay RA1 is able to operate. In addition, the operated relay SM opens its contacts 4 and 5 and its other contacts (not shown) to prevent the other alarm circuit relays RX and RX1, and their equivalents (not shown) for the stations B–W from operating until the emergency condition at station A is recorded at the telephone central office. Also, relay SM opens its contact 3 in the operate circuit for relay RA; however, relay RA is not released at this time because its contact 6 is closed. Relay SM also closes its contact 6 to provide itself with a locking circuit, which circuit is hereinafter described.

The motor includes a shaft S upon which is mounted an assembly consisting of an insulator I to which are attached the brushes 1, 2, 3, and 4; and the conductors 5 and 6 for electrically connecting the brush 1 with 2 and 3 with 4, respectively. Brushes 1, 2, 3, and 4, in turn, are electrically connected to the rings A, B, C, and D, respectively, of the stationary disc SD. These rings each comprise conductive materials shown by the light areas in the drawing and non-conductive materials shown by the darkened areas in the drawing. All of the conductive materials on a ring are electrically connected together, although the connections are not illustrated in the drawing. Each of these rings are embedded in the stationary disc insulator material IA. During the period when the motor is not operating, the brushes 1, 2, 3, and 4 rest on the disc SD at the position RP. As was mentioned previously, when relay RA operated its contact 7, a circuit was closed for operating relay SM. This circuit extends from ground through the conductive material CM1 of ring A, brush 1, conductor 5, brush 2, the conductive material CM2 of ring B, contact 7 of relay RA, and the winding of relay SM to negative potential P2. When relay SM operates, it closes its contact 6 to provide a shunt path around contact 7 of relay RA to lock itself operated under the control of the ground potential connected to material CM1 of ring A. When the SM relay contact 1 is closed, the motor operates in the obvious circuit and simultaneously rotates the shaft S and the brush assembly from the rest position RP in a circular direction, indicated in the drawing, at one revolution per minute to cause the brushes 1 2, 3, and 4 to brush over the rings A, B, C, and D, respectively.

After the motor is operated, a person at station A has approximately thirty seconds to open the alarm deactivating contact SA1 to deactivate the RA relay alarm circuit and thereby prevent the initiation of equipment operations in the telephone central office. This deactivation feature is utilized, for example, when the emergency indicating contact SA is accidentally closed. If contact SA1 is opened during the thirty second interval, the operate circuit for relay RA is opened and relay RA releases. The release action of relay RA re-opens its contacts 3 and 4 to disconnect the control line CL from the line LAA and recloses its contacts 1 and 2 to connect the line LAA to line LA and the telephone set TSA for restoring regular telephone service. If an emergency condition is present in one of the other stations, B–X at the time relay RA releases, it will not be recognized until the SM relay is released as hereinafter described. It is noted that the motor would continue to operate after relay RA relates to complete the remainder of one revolution and would then be stopped as described in the subsequent paragraphs.

On the other hand, if contact SA1 at station A is not opened within thirty seconds the following operations occur. Brush 4 makes initial contact with the conductive material CM4 of ring D, approximately thirty seconds after the brush assembly rotation is started to connect together the leads L1 and L2 of line CL for originating an alarm call by a closed direct current circuit extending over line CL through contacts 3 and 4 of relay RA, and line LAA to apparatus (not shown) in the telephone central office. These leads are connected together through the conductive material CM3 of ring C, brush 3, conductor 6, brush 4, and the conductive material CM4 of ring D. This closure of the direct current circuit is the equivalent of an off-hook signal sent to the central office when a customer lifts the telephone receiver from its cradle at station A to originate a call.

As similarly described in the hereinbefore identified Smits et al. patent, when a call is originated over the line LAA, equipment (not shown) in the central office is operated to identify the calling line. The equipment (not shown) then proceeds to seize an idle originating register (not shown) in the central office, to pass the calling line identity to the register, and to connect the register with the line LAA. These equipment operations are normally completed during light traffic periods in approximately two seconds and during heavy traffic periods in less than five seconds. For this reason, the leads L1 and L2 of line CL are connected together over the previously described path for approximately six seconds before the leads L1 and L2 are again disconnected to start the pulsing of the alarm code which indicates the type of emergency condition at the station A.

The telephone system equipment described in the Smits et al. patent is arranged to gather and record information on telephone calls directed to a customer station assigned the numer 3775. This information identifies the calling line and called customer station numbers and other indicia which aid in locating the originator of calls to the customer station 3775. In the exemplary employemnt of this invention the same equipment is used in the central office to gather and record information on telephone calls for which an alarm code is transmitted to the equipment over any of the lines LAA–XA to indicate an emergency condition at the associated customer station. Such calls are not completed to any customer station. The equipment merely responds to the origination of a call and the transmission of the alarm code to gather and record information which indicates the nature of the emergency and the customer station whereat the emergency condition is present. While any code may be used with the present invention, it is convenient to simplify the following description of this invention by assuming that the code 3775 is herein designated as the alarm code for indicating emergency conditions at the stations A–X. In this way only the general functions of the equipment need be described for a complete understanding of the invention and further reference may be made to the Smits et al. patent for the additional characteristic details of the equipment. In order to avoid code conflicts between working customer station numbers and the alarm code, it is desirable that the alarm code be different from the working customer station numbers.

After the originating register (not shown) in the central office is connected to the line LAA, as previously explained, the alarm code 3775 is sent by dial pulsing from the control unit ACU. As is well known, dial pulsing is a direct current pulsing arrangement in which digits of a code are transmitted by the interruption of a direct current circuit a number of times, one to ten corresponding to the digits one to zero on a telephone dial. The code 3775 is sent over line CL through contacts 3 and 4 of relay RA and line LAA to the register (not shown) by opening and closing the connection between leads L1 and L2 of line CL to interrupt the direct current circuit extending therebetween as brush 4 is rotated around ring D of the disc SD. The code is then registered in digit registers (not shown) of the originating register (not shown). Ring D of disc SD has four groups of insulator materials, designated G1, G2, G3, and G4 and shown by the darkened areas in the drawing, which are used to open the connections between leads L1 and L2 to send the code 3775 to the originating register (not shown). As indicated in the drawing, the group G1 comprises three segments of insulator materials to open the connections three times to transmit a digit 3. Groups G2 and G3 each comprise seven segments to open the connection seven times to transmit a digit 7. Group G4 comprises five segments to open the connection five times and transmit a digit 5. The conductive material CM4 placed between each of the insulator segments in a group and between the groups G1, G2, G3, and G4 are designed to transmit each of the digits at a rate of ten pulses per second with a one second interdigital interval.

In the event a person at station A should open the alarm deactivating contact SA1 at any point following the origination of a call over line LAA, it is noted that the relay RA would be released. Upon releasing, relay RA operates its contacts 1, 2, 3, and 4 to cause the line LAA to be transferred from the line CL to the line LA. As a result, the direct current circuit extending over line LAA would be opened and the central office equipment (not shown) would recognize it as an abandoned call and would automatically release. The release of relay RA also opens, at its contacts 7, the operate path of relay SM However, relay SM remains locked operated to its contact 6. Relay SM is held operated to insure that the motor rotates the shaft S and the brush assembly one complete revolution. This is necessary to control, at the established sequence, circuit operations in the alarm control unit ACU and the central office.

As is completely described in the Smits et al. patent, when code 3775 is registered in the originating register (not shown) various circuit operations occur in the central office which cause trouble recorder equipment (not shown) therein to make a punched card record of the alarm code and of information which indicates the identity of the customer station A. These circuit and equipment operations are generally completed in less than four seconds. Subsequently, the maintenance personnel at the central office are summoned to review the card record. Upon determining that an alarm code is printed thereon, the personnel utilizes the recorded information thereon to identify the associated customer name and address and then proceeds to notify the appropriate authorities of the customer emergency condition.

Before proceeding further with the system description, it is noted that one modification of telephone equipment described in the Smits et al. patent is suggested for its use with the present invention. In the Smits et al. patent, two common control circuit designated markers are used in detecting annoyance calls. The first marker is used on each call directed to a party troubled by annoyance calls to effect the operation of a trouble recorder for making a punched card record, so that it is possible to identify the calling party originating annoyance calls. After this record is made, the trouble recorder effects the release of the first marker which in turn causes a second marker to be used to complete the call to the called station. In connection with the present invention, it is not necessary to use a second marker because, after the punched card record is made, the required equipment functions are completed and the telephone equipment can be released. For the present invention, therefore, it is suggested that an additional two-spring contact be added to the polarized relay AC of the annoyance call circuit shown in FIG. 2 of the aforementioned Smits et al. patent and that one spring of the contact be connected to ground potential and the other spring of the contact be connected to the junction of the undesignated resistor and the lower winding of relay CB in the originating register marker connector of FIG. 3 of the Smits et al. patent. This contact would then be closed when relay AC is operated upon registration of the code 3775 in an originating register and would provide a shunt path around the operate winding for relay CB in the originating circuit marker connector FIG. 3 in the Smits et al. patent. The first marker engaged on an alarm call is then prevented from releasing until instructed to do so by the alarm control unit ACU of the present invention.

Referring again to the alarm control unit ACU, the brush assembly continues to rotate following the completion of dial pulsing and approximately four seconds elapses before any further circuit operations occur therein. This four second interval allows the punched card record to be made by the trouble recorder (not shown) in the central office before circuits in unit ACU are operated to effect the release of the central office equipment (not shown) which is used for the instant call. Thereafter, brush 4 is moved into contact with the insulator material of ring D to open the connection between leads L1 and L2 of line CL thereby to open the direct current circuit extending thereover to cause the release of the central office equipment (not shown). The disconnection of these leads is the equivalent of an on-hook signal sent to the central office when a customer replaces the telephone receiver on its cradle at the station A at the end of a call.

Approximately ten seconds after brush 4 makes the last mentioned contact with the insulator material on ring D, brush 2 moves from the conductive material CM2 to the insulator material on ring B and thereby opens the operate circuit for relay SM to effect its release. Upon releasing, relay SM opens, at its contact 1, the operate circuit for the motor to deactivate the motor and thereby cause the brush assembly to stop at the rest position RP on disc SD. The release action of relay SM also causes its contact 2 to actuate and close the operate circuit for relay RA1. This circuit extends from ground at station A through contacts SA and SA1, over lead ALA to the unit ACU, contact 5 of relay RA, contact 2 of relay SM, and the winding of relay RA1 to potential P1. Relay RA1 operates and actuates its contact 1 to close a shunt path around contact 5 of relay RA and contact 2 of relay SM to maintain the continuity of the operate circuit for relay RA1 after relay RA is subsequently released. Relay RA1 also actuates its contact 2 to open the operate circuit of relay RA and thereby effects the release of relay RA. The release of relay RA causes its contacts 3 and 4 to reopen to disconnect the line LAA from line CL, and its contacts 1 and 2 to reclose to reconnect line LAA to line LA and the telephone set TSA and thereby permits the resumption of regular telephone service. Upon releasing, relay RA also opens its contact 7 to prevent relay SM from reoperating through this path when ground is subsequently connected through ring A, brush 1, conductor 6, and brush 2 of ring B.

The release action of relay SM also allows an emergency condition at one of the other customer stations B–X to effect the engagement of alarm control unit ACU. For example, if such a condition is present at station X, the alarm indicating contact SX will be operated, and upon the reclosure of the SM relay contact 5, the operate circuit for relay RX will be closed to operate relay RX. This circuit extends ground at station X through contacts SX and SX1, over lead ALX to the unit ACU, contact 2 of relay RX1, contact 5 of relay SM, and the winding of relay RX to the negative potential P3. When relay RX operates, it transfers, at its contacts 1, 2, 3, and 4, the connection of line LXA from line LX and the telephone set TSX to the control line CL. It also closes its contact 5 to complete a circuit for operating relay RX1; however, relay RX1 is a slow operate relay and is not permitted to operate at this time because relay SM is reoperated, as hereinafter explained, to open the RX1 relay operate circuit, at the SM relay contact 4 before relay RX1 has time to operate. In addition, relay RX closes at its contact 6, a shunt path around the SM relay contact 5 to prevent the RX relay operate circuit from being opened when relay SM subsequently reoperates. Relay RX also partially closes the operate circuit for relay SM at its contact 7 to allow the relay SM to reoperate when ground is subsequently connected to this contact over the path extending through the conductive material CM2 of ring B, brush 2, conductor 5, brush 1, and the conductive material CM1 of ring A to ground.

Brush 2, after making initial contact to the insulator material of ring B, remains in contact therewith during brush assembly rotation for approximately 500 milliseconds and is thereafter reconnected to the conductive material CM2 of ring B. If no emergency condition is present in any of the stations B–X at the time brush 2 is reconnected to the material CM2, the alarm control unit ACU is partially restored to the idle condition. The only apparatus which then remains operated in the unit ACU is the relay RA1. This relay is subsequently released by opening either contact SA or SA1 at the customer station A.

On the other hand, if the alarm circuitry associated with station X was operated as previously described, the reconnection of brush 2 to the material CM2 of ring B then closes a circuit for reoperating SM. This operate circuit extends from ground through the conductive material CM1 of ring A, brush 1, conductor 5, brush 2, material CM2 of ring B, contact 7 of relay RX, and winding of relay SM to potential P2. Upon reoperating, relay SM would operate its contact 4 to open the operate circuit for relay RX1 to prevent its operation at this time. In addition, other contacts (not shown) of relay SM would open the operate circuits for the individual alarm circuit relays (the RX and RX1 relay equivalents not shown) for the stations B–W to prevent any of these relays from operating until the emergency condition at station X is recorded at the central office. The reoperation of relay SM also recloses the operate circuit for the motor to cause the motor to continue its operation and the brush assembly rotation for another complete revolution. After the motor rotates the brush assembly past the rest position RP on the disc SD, the circuit operations that follow are essentially the same as those previously described with respect to the emergency condition at station A.

It is to be understood that the above-described arrangements are illustrative of the application of the principles of this invention. In light of this teaching, it is apparent that numerous other arrangements may be devised by those skilled in the art without departing from the spirit and scope of the invention.

What is claimed is:

1. In a telephone system, a central office, a telephone station, a communication channel extending between said office and said station, alarm control means associated with said station and said channel, means in said control means responsive to an emergency condition at said station for originating an alarm call over said channel, means in said office responsive to the origination of said call over said channel for supplying information indicating the identity of said station, means in said control means operable subsequent to said call origination for transmitting code pulses over said channel to said office to signify the nature of the emergency at said station, and means in said office responsive to said pulses for recording said supplied information and the nature of the emergency signified by said pulses.

2. In a telephone system, a central office, a plurality of telephone stations, a plurality of telephone lines, each of said lines associated with said office and one of said stations, means connectable to any one of said lines to transmit information thereover to said office in response to a predetermined condition at the associated station, means in said office responsive to the information received over any one of said lines for supplying information indicating the identity of said station associated with that line, and means in said office responsive to said information received over any one of said lines for recording said received information and said supplied information.

3. In a telephone system, a central office, a plurality of telephone stations, a plurality of telephone lines, each of said lines associated with said office and one of said stations, means connectable to any one of said lines in response to an emergency condition at said associated station to transmit thereover to said office alarm information representing the type of emergency condition, means in said office responsive to the information received over said line for supplying information indicating the identity of said station associated with that line, means in said office connectable to any one of said lines for registering the received information, and means in said office responsive to the registration of said information in said register means for recording said registered information and said supplied information.

4. In a telephone system, a central office, a plurality of telephone stations, each of said stations having a discrete identity code, a plurality of telephone lines, each of said lines associated with said office and one of said stations, a transmitter responsive to an emergency condition at any of said stations for supplying alarm information to said line associated with the station having said emergency condition, said information being different from any of said station identity codes, means in said office responsive to said information on said line for supplying information indicating the identity code of the station having said emergency condition, and means in said office responsive to said information on said line for recording said supplied information and said alarm information.

5. In a telephone system, a central office, a plurality of telephone stations, each of said stations having a discrete identity code, a plurality of telephone lines, each of said lines associated with said office and one of said stations, a transmitter responsive to an emergancy at any of said stations for supplying alarm information to said line associated with the station having an emergency, said information being different from any of said station identity codes, means in said office responsive to said information on said line for supplying information indicating the identity code of the station having said emergency, means in said office connectable to said line for registering said alarm information, and means in said office responsive to the registration of said information in said register means for recording said supplied information and said registered alarm information.

6. In a telephone system, a central office, a plurality of telephone stations, a plurality of telephone lines, each of said lines associated with said office and one of said stations, a generator responsive to an emergency condition at any one of said stations for generating an alarm code representing the type of emergency condition, means for connecting said alarm code to the line associated with the station having the emergency condition, means in said office responsive to said alarm code on said line for supplying information indicating the identity of said station associated with that line, and means in said office responsive to said alarm code on said line for recording said alarm code and said supplied information.

7. In a telephone system, a central office, a plurality of telephone stations, a plurality of telephone lines, each of said lines associated with said office and one of said stations, a generator responsive to a predetermined condition at any one of said stations for generating a code indicating the nature of said condition, means for connecting said code to the line associated with the station having the condition, means in said office responsive to said code on said line for supplying information indicating the identity of said station associated with that line, means in said office connectable to said line for registering said code thereon, and means in said office responsive to the registration of said code in said register means for recording said supplied information and said code.

8. In a telephone system, a central office, a plurality of telephone stations, a plurality of telephone lines, each of said lines associated with said office and one of said stations, means associated with each of said stations and each of said lines responsive to an emergency condition at any of said stations for making an alarm call over said line associated with the station having the emergency condition, a transmitter included in said call making means for transmitting code pulses over said line to report the nature of said emergency to said office, means in said office responsive to the making of said call over said line for supplying information indicating the identity of said station having said emergency condition, and means in said office responsive to the reception of said pulses for recording said supplied information and the nature of said emergency.

9. In a telephone system, a central office, a plurality of customer stations, a plurality of telephone lines, each of said lines associated with said office and one of said stations, a transmitter for serving all of said stations and connectable to any one of said lines in response to a predetermined condition at the associated station for transmitting information thereover to said office, and means in said office responsive to the received information for producing a record of said information.

10. In a telephone system, a central office, a plurality of customer stations, a plurality of telephone lines, each of said lines associated with said office and one of said stations, a transmitter for serving all of said stations and connectable to any one of said lines in response to a predetermined condition at the associated station for transmitting a code thereover to said office, and means in said office responsive to the code received over any one of said lines for producing a record indicating said condition and the identity of the station having said condition.

11. In a telephone system, a central office, a plurality of telephone stations, each of said stations having a discrete identity code, a plurality of telephone lines, each of said lines associated with said office and one of said stations, communication means at each of said stations connected to said associated lines for facilitating communication between said stations and said office, alarm control means associated with each of said stations and each of said lines, means in said control means responsive to an emergency at any one of said stations for disconnecting from said associated line said communication means at the station having the emergency, means in said control means connectable to any one of said lines in response to an emergency at said station associated with said one line for transmitting code pulses to said office, means in said office responsive to the received pulses for producing a record of the nature of said emergency and of information for determining the identity code of said station having said emergency, and means in said control means operative subsequent to said record production effective for reconnecting to said associated line said communication means at said station having said emergency.

12. In a telephone system, a central office, a plurality of customer stations, each of said stations having a discrete identity code, a plurality of telephone lines, each of said lines associated with said office and one of said stations, alarm control means associable with each of said stations and each of said lines, a control line in said control means connectable with any of said lines to said office, means in said control means responsive to an emergency at any one of said associated stations for connecting said control line to said line associated with the station having an emergency, means in said control means responsive to an emergency at any one of said associated stations for transmitting an alarm code to said office over said control line and said line associated with the station having the emergency, means in said office responsive to the received alarm code for producing a record of the nature of said emergency and of information for determining the identity code of said station having said emergency, and means in said control means operative subsequent to said record production for disconnecting said control line from said line associated with said station having said emergency.

13. In a telephone system, a central office, a plurality of customer stations, each of said stations having a discrete identity code, a plurality of telephone lines, each of said lines associated with said office and one of said stations, communication means at each of said stations connected to said associated lines for facilitating communication between said stations and said office, alarm control means for controlling the making of alarm calls over any of said lines to said office, means in said control means responsive to an emergency at any one of said stations for disconnecting from said associated line said communication means at said station having the emergency, a control line in said control means connectable to any of said lines to said office, means in said control means responsive to an emergency at any one of said stations for connecting said control line to said line associated with the station having the emergency, means in said control means responsive to an emergency at any one of said stations for originating an alarm call to said office over said control line and said line associated with the station having the emergency, means in said control means for transmitting subsequent to said call origination an alarm code to said office over said control line and said line associated with said station having said emergency, means in said office connectable to said line associated with said station having said emergency in response to said call origination thereover for registering the received alarm code, means in said office responsive to the registration of said alarm code in said registering means for producing a record of the nature of said emergency and of information for determining the identity code of the station having the emergency, means in said control means operative subsequent to said record production for disconnecting said control line from said line associated with said station having said emergency, and means in said control means operative subsequent to said record production for reconnecting to said associated line said communication means at the station having said emergency.

14. In a telephone system, a central office, a telephone station, a communication channel extending between said office and said station, communication means in said station connected to said channel for facilitating communication between said station and said office, means responsive to an emergency in said station for effecting the disconnection of said communication means from said channel, means responsive to an emergency at said station for transmitting coded pulses over said channel to said office to identify the type of emergency thereat, means in said office responsive to said emergency for identifying said station, means in said office activated by said identifying means for recording the identity of said station and the type of emergency identified by said pulses, and means operative subsequent to said recording for effecting the reconnection of said communication means to said channel.

15. In a switching system, a central office, a local station, a communication channel extending between said office and said station, means responsive to an emergency at said station for transmitting over said channel to said office alarm information including coded pulses signifying the nature of said emergency, means in said office responsive to the receipt of said information for supplying the identity of said station, and means in said office controlled by said identifying means and responsive to the receipt of said pulses for producing a record indicating the identity of said station and the nature of said emergency signified by said pulses.

16. In a switching system, a central office, a customer station, a communication channel extending between said office and said station, means responsive to an emergency at said station for transmitting electrical pulses over said channel to said office, means in said office connectable to said channel for registering the received pulses, means in said office activated by said registering means for supplying the identity of said station, and means in said office responsive to the registration of said pulses in said registering means for producing a record indicating the nature of said emergency and the supplied identity of said station.

17. In a telephone system, a central office, a telephone station, a telephone line extending between said office and said station, communication means in said station connected to said line for facilitating communication between said station and said office, alarm control means associated with said station and said line, means in said control means responsive to an emergency at said station for disconnecting said communication means from said line, means in said control means responsive to an emergency at said station for originating an alarm call over said line, means in said control means operable subsequent to said call origination for transmitting code pulses over said line to said office to signify the nature of said emergency, means in said office connectable to said line in response to said call origination for registering the received code pulses, means in said office activated by said registering means for supplying the identity of said station, means in said office operated by said supplying means for producing a record indicating the nature of said emergency and the identity of said station, and means in said control means operative subsequent to said recording for reconnecting said communication means to said line.

18. In a communication system, a central office, a communication station, a communication line extending between said office and said station, means in said station connected over said line to said office for communicating therebetween, alarm control means associated with said station and said line, means in said control means responsive to an emergency condition in said station for disconnecting said communicating means from said line, means in said control means responsive to an emergency condition in said station for originating an alarm call over said line, means in said office responsive to said call origination for supplying the identity of said station, means in said control means for transmitting an alarm code over said line to said office subsequent to said call origination, means in said office connectable to said line for registering the received alarm code, means in said office responsive to the registration of said alarm code in said register means for recording said received alarm code and said supplied station identity, and means in said control means operative subsequent to said recording for reconnecting said communicating means to said line.

References Cited by the Examiner

UNITED STATES PATENTS

| | | | |
|---|---|---|---|
| 2,555,714 | 6/51 | Talbot | 179—5.1 |
| 2,887,535 | 5/59 | Craddock | 179—5 |
| 2,905,762 | 9/59 | Rettie et al. | 179—5.1 |
| 2,923,772 | 2/60 | Wadsworth | 179—5 |

DAVID G. REDINBAUGH, *Primary Examiner.*

L. MILLER ANDRUS, ROBERT ROSE, *Examiners.*